United States Patent Office 3,198,816
Patented Aug. 3, 1965

3,198,816
SELECTIVE HYDROGENATION OF
FATTY OILS
Mykola Zajcew, Newark, N.J., assignor to Engelhard Industries, Inc., Newark, N.J., a corporation of Delaware
No Drawing. Filed Dec. 28, 1962, Ser. No. 247,882
11 Claims. (Cl. 260—409)

This application is a continuation-in-part of my copending application Serial No. 724,823, filed March 31, 1958, now U.S. Patent No. 3,123,574.

This invention relates to an improved method for the selective hydrogenation of fatty oils. In particular, this invention provides an improved method for the selective hydrogenation of unsaturated fatty acids as castor oil containing hydroxyl groups, and for the selective hydrogenation of unsaturated fatty oils containing three, two, and one olefinic linkages. Selective hydrogenation of the castor oil gives a valuable product known as "castor wax," and selective hydrogenation of oils containing multiple olefinic linkages in the crux of the production of edible fats such as margarine and shortening. This invention relates especially to improved catalysts of palladium which have been modified by the addition of one or more other metals so as to give catalysts showing a very high order of selectivity. Although these catalysts were designed for use with unsaturated glycerides, they may be used with other unsaturated esters and with unsaturated free acids as well.

Hydrogenated castor oil is a valuable product, having wide and diverse industrial use, and about six million pounds are produced annually in the United States. It enjoys wide popularity as the result of a number of desirable properties, including hardness, low solubility in organic solvents, non-toxicity, oxidation stability, and high dielectric constants, i.e. 12 at 30° C. and 22 at 60° C. for 100 cycles. These desirable properties of hydrogenated castor oil are obtained only if the hydrogenation of the oil is selectively performed, i.e. most of the olefinic linkages are reduced without appreciable hydrogenolysis of the hydroxyl function.

Castor oil contains glycerides of ricinoleic acid, 85–87 percent, oleic acid, 6–8 percent, linoleic acid, 3–5 percent, saturated acids 2.5–3 percent, and a small amount of dihydroxystearic acid, 0.5–2 percent. A saturated hydrogenated castor oil has an iodine value of 2.5–8.5, a melting point of 85–86° C., a hydroxyl value of 145–160, and an acid value less than 2. Thus, in the hydrogenation of castor oil the iodine value must be reduced by about 90 to 97 percent, while the hydroxyl value may be reduced by only about 9 percent. Catalysts for this hydrogenation are, therefore, necessarily limited to those having an adequate selectivity.

Nickel catalysts have been used most widely in industry for the hydrogenation of castor oil and, generally, hydrogenations using nickel catalysts are performed under high pressures in the range of 15 to 150 atmospheres, and temperatures in the range of 160–170° C. Higher temperatures are avoided in order to minimize dehydroxylation, but the use of temperatures as high as 260° C., at a pressure of 110 atmospheres, has been reported to produce little loss of hydroxyl function when a copper catalyst is used.

In accordance with the present invention, palladium catalysts are provided for the hydrogenation of castor oil and other fatty oils. Hydrogenations performed using palladium result in certain advantages not found when other catalysts are employed. Palladium is an extremely active catalyst, and satisfactory hydrogenations may be performed rapidly, using small quantities of catalysts at room temperatures and pressures. The use of low temperatures and pressures permits the use of inexpensive equipment, and the rapid reaction possible with palladium, results in a high space-time yield of product from such equipment. In addition, the mild operating conditions possible using palladium catalysts limits the undesirable side reactions occurring when more extreme conditions are required. The palladium catalyst may be used repeatedly, and the catalysts may be filtered from each finished batch and recharged to the next succeeding batch, when a batchwise process is employed. Or, of course, the catalyst may be used in a continuous process. When the catalyst is finally spent, the palladium metal may be recovered, reworked and made into new catalyst. Thus, since palladium can be used repeatedly and finally reclaimed, it frequently proves more economical than metals which sell at a much cheaper price per pound such as nickel for example.

It is important that a catalyst used in the hydrogenation of fatty oils for margarine oil, display high selectivity, i.e. fats containing three double bonds should be hydrogenated before those containing two, and those, in turn before the fats containing one double bond.

The catalysts of the present invention are particularly useful for the hydrogenation of shortening stocks, since these catalysts produce fewer trans isomers than do other catalysts. Unsaturated fats occur in nature almost entirely as the cis isomers, but during the usual hydrogenations, many of these olefins that are not reduced are converted to trans isomers, which is an undesired side reaction. Trans isomers, in general, have higher melting points than do cis isomers, and the presence of trans isomers in shortening, has a deleterious effect on the product. It is necessary that shortening have a long plastic range, i.e., that it be plastic at refrigerator temperatures and has some "body" at about 40° C; shortening will not have a long plastic range if it contains appreciable quantities of trans isomers. Although margarine oils used for the preparation of margarine may have a high content of trans isomers, excessive quantities thereof, which form at the high temperatures of margarine oil processing, result in high melting point hydrogenated oils, and these melting points should be higher than the temperature of the human body, i.e., about 36° C. The use of improved palladium catalysts, lowers this temperature to the desired range. (See Table II.)

The catalyst used in accordance with the present invention is palladium modified by the addition of a modifying material selected from the group consisting of a compound of bismuth, of silver and of bismuth together with a silver compound.

The palladium catalyst with modifications of bismuth or silver or both is preferably supported on a carrier, for example carbon. It is preferable that all three metals be contacted with the carrier in the form of soluble compounds, for example water soluble compounds in aqueous solution. Suitable palladium compounds include $Na_2PdCl_4$, $PdCl_2$, $PdSO_4$ and $Pd(NO_3)_2$, suitable bismuth compounds include bismuth subacetate, bismuth acetate, $BiCl_3$ and BiOCl, and suitable silver compounds include silver acetate, $Ag_2SO_4$ and $AgNO_3$. Either in preparation or during hydrogenation of the fatty oil a reductive effect on the catalyst occurs, so that after use the palladium and silver compounds may be found wholly or partially reduced to metal. The bismuth compound however, generally remains unreduced.

The catalyst may be prepared by precipitation or absorption, i.e., the metals may be co-precipitated, or one metal may be precipitated after the other metal is already on a support. The metals may also be absorbed together, or one metal may be absorbed after the other is on the catalyst support.

For example, a stirred suspension of water and palladium metal, on a support such as carbon, may be prepared, and to this mixture may be added a soluble compound of silver, bismuth, or mixtures thereof, slowly while stirring. The mixture is then heated to a temperature in the range of about 50–90° C., and after the addition is complete, the mixture is stirred while hot for another interval of about 5 minutes to one hour, after which the solids are separated, washed and dried.

A second method of preparing the catalyst is to suspend a catalyst support in water and add a solution of a compound of palladium and one of more solution of modifying compounds, such as silver acetate and bismuth subacetate, for example. A precipitating agent is then added, such as sodium formate, and stirring of the solution at a temperature in the range of 50–90° C. is continued. The hot solution is then filtered, washed and the precipitate is dried.

In both of the foregoing procedures, the catalyst consists of palladium on a support, modified by a compound of silver of bismuth or an organo complex involving one of these metals.

In the preparation of the novel catalyst of the invention, the palladium may be present on the support in an amount of about .001 to 10. percent by weight of the total catalyst, i.e. including the support, preferably .01 to 1 percent by weight, and the compound of the modifying metal may be either precipitated or absorbed on the supported palladium catalyst in a quantity in the range of about .005 to 10 percent of the total catalyst weight, preferably 0.005 to 1.0 percent by weight. When preparing the catalyst by precipitation of the modifying metal compounds onto the supported palladium catalyst, the temperature of the mixture of catalyst and soluble modifying metal compounds, should be in range of about 20 to 100° C., preferably 70 to 90° C., and this mixture should be heated for a period of 0.3 to 2 hours. When co-precipitating palladium from a solution thereof onto a carrier, together with the compound of the modifying metal, the temperature of the suspension should be in the range of 20 to 100° C., preferably 70 to 90° C., and the suspension should be heated for a period of 0.5 to 2 hours.

Among the catalyst supports which may be used to prepare the catalyst of the present invention, are carbon, alumina, including activated alumina, silica gel, kieselguhr, asbestos, and the like, but carbon is the preferred support for a number of reasons, including ease of recovery of the catalytic metal.

The catalysts may be granular, extruded, or pelleted if used as stationary catalysts, as in a continuous process, or preferably powdered if used in batch processes.

In the hydrogenation of fatty oils, the hydrogenation may be performed in an ordinary hydrogenator, in which hydrogen is added in the conventional manner, i.e. it may be pressured in over the oil, or bubbled up through the oil. Hydrogenations performed during using the catalyst of the present invention generally are performed using a temperature in the range of about 40 to 200° C., hydrogenation time in the range of about 30 to 600 minutes, a pressure in the range of atmospheric to about 1,000 p.s.i.g., preferably atmospheric to about 100 p.s.i.g., and using a catalytic metal concentration, based upon the weight of oil hydrogenated, in the range of about 0.00005 to 0.1 percent.

The invention will be further illustrated by reference to the following specific examples:

EXAMPLE I 3.75 grams of basic bismuth acetate were boiled in 300 ml. of glacial acetic acid, and evaporated to 200 ml. of clear solution. 8.13 grams of silver acetate were boiled in 800–900 ml. of 1 percent by weight acetic acid and these two solutions were combined and diluted to a volume of about 1.5 liter with water. The combined solutions were then added slowly, over a period of 30 minutes, to 1500 grams of a 1 percent by weight, palladium on carbon catalyst (carbon particle size=10–100 microns), vigorously stirred in 15 liters of water. 25 grams of sodium formate, dissolved in 100 ml. of water were added dropwise. The resulting solution was heated to boiling, and maintained close to boiling temperature for a period of 20 minutes. After settling the solutions was decanted, and the catalyst was filtered, washed and dried at a temperature of 100° C.

(Ratio Pd:Ag:BiOAc=1:0.35:0.25)

The dried catalyst assayed (weight basis): Pd=0.99 percent, Ag=0.32 percent, and Bi=0.36 percent.

EXAMPLE II 1 kilogram of a catalyst consisting of 1 percent by weight, palladium metal supported on carbon powder (carbon particles size=10–100 microns), was mixed with 3 liters of water, and to this mixture was added a solution of 5.45 grams of silver acetate in 250 ml. of water, and 2.5 grams of basic bismuth acetate in 250 ml. of 5 percent by weight, acetic acid. The addition was made slowly, with stirring, and the mixture was maintained at a temperature of 85–90° C. during the addition, which required about one hour. After the addition was complete, the mixture was stirred at a temperature of 90° C. for an additional half-hour period. The mixture was then filtered, and the solids were washed with water, and dried at a temperature of 90–95° C. (Ratio Pd:Ag:BiOAc=1:0.35:0.25.)

EXAMPLE III 1 kilogram of a catalyst consisting of 0.1 percent by weight, palladium on granular alumina (8–14 mesh), was mixed with 2 liters of water. Solution consisting of 1.548 grams of silver acetate (equivalent to 1 gram of silver) in 250 ml. of water and 0.7 gram of bismuth subacetate in 100 ml. of 5 percent acetic acid, were then added slowly to the palladium catalyst, and the mixture was heated to a temperature of 85–95° C. A solution of 5 grams of sodium formate dissolved in 100 ml. of water, was then slowly added, and after the addition was complete, the mixture was heated for an additional half-hour, filtered, and the solids were washed with water, and dried at a temperature of 90–95° C. (Ratio Pd:Ag:BiOAc=1:1:0.7.) The dried catalyst assayed (weight basis): Pd=0.09 percent, Ag=0.11 percent, and Bi=0.09 percent. This catalyst is particularly useful in continuous hydrogenation processes.

EXAMPLE IV

A number of hydrogenations were performed in which a stainless steel hydrogenator was successively charged with a 3-pound charge of castor oil. The hydrogenations were performed using intensive agitation, and at the temperature the times indicated in the Table I below. It was found that selectivity was not affected by changing the rate of agitation, but the reaction rate increased appreciably with increasing agitation. Processing was controlled by a rapid melting point determination of the product (modified A.O.C.S. method Cc–3–25. 10 minutes on the ice). Castor oil, non-selectively hydrogenated, is primarily glycerides of stearic acid having a melting point of about 70° C. Iodine values were determined at a constant temperature of 24° C., using Hanu's method. Determination of capillary melting point, hydroxyl numbers and acidities, was made according to the official method of the American Oil Chemists' Society.

The conditions employed in the hydrogenations and the experimental results are summarized in Table I below.

Using an unmodified 5 percent by weight, palladium on charcoal catalyst A, a satisfactory product could not be obtained. This catalyst was nonselective, and hydroxyl groups were too rapidly reduced concurrently with the olefin. A 1 percent by weight, palladium on charcoal catalyst B gave a more, although not completely, satisfactory product. The catalyst produced a castor wax having a maximum melting point of 83.5° C. and a maximum hydroxyl value of 135.5 (note Experiment 6).

An entirely satisfactory product was obtained using catalyst C, which is the catalyst prepared in accordance with the procedure of Example I above. The products obtained in Experiments 9 and 10 were good, high-quality castor wax. There was no increase in the acidity value, thereby indicating the absence of side reactions, such as hydrolysis, estolide formation, and etherification. The selectivity of this catalyst is apparent from Experiment 3, in which in 60 minutes of processing, the iodine value decreased 25 percent, but the hydroxyl number was unchanged. These products were obtained under extremely mild reaction conditions, which would effect an appreciable operating economy in commercial operation.

EXAMPLE V

A number of catalysts consisting of palladium and modifying compounds were compared with ordinary palladium on carbon, in the hydrogenation of cottonseed oil and soybean oil for shortening stock and margarine oil. In the Tables II and III below, the reaction conditions and the results obtained are listed. Each of the catalysts was supported on carbon having a particle size of 10–100 microns.

Catalyst No. 1 in Table II is a commercial palladium on carbon catalyst. The preparation of catalyst No. 2 is identical with the preparation disclosed in Example II above, except that the bismuth compound is omitted. The preparation of catalyst No. 3 is identical with that disclosed in Example II above, except that the silver compound is omitted. The preparation of catalyst No. 4 is disclosed in Example II above.

Catalyst No. 5 is a commercial palladium on carbon catalyst. Catalyst No. 6 is the same as No. 4 except that less basic bismuth acetate was added.

In Table III, catalyst No. 7 is a commercial palladium catalyst identical with catalyst Nos. 1 and 5 of Table II. Catalyst No. 8 is identical with catalyst No. 4. Catalyst No. 9 is prepared in the same way as No. 4, except that less bismuth and silver compounds were used.

It will be noted from the data in Table II that in each case each of the modified palladium catalysts gave less trans isomers in the product than did ordinary, unmodified palladium on carbon catalyst. Also, it is to be noted that each melting point (Wiley) of products made with modified palladium catalysts is satisfactory; those made with unmodified palladium catalysts are unsatisfactory. Furthermore, the modified catalysts displayed a greater selectivity in reducing linoleic acid; in each case the linoleic acid content is lower when a modified catalyst is used.

*Table II*
HYDROGENATION OF COTTONSEED AND SOYBEAN OILS FOR MARGARINE OIL

| Experiment | Oil | Catalyst | Percent Pd in Oil | T., °C | Pressure, p.s.i.g. | Agitation | Time, mins. | I.N. | Wiley M.P. | Hydrogenated product ||||
|---|---|---|---|---|---|---|---|---|---|---|---|---|---|
| | | | | | | | | | | Congeal Point | Linoleic Acid | Saturated Acid | Trans Isomers |
| 1 | Cottonseed | 1% Pd on C | 0.0025 | 185 | 0 | High | 90 | 69 | 37.8 | 29.6 | 7.8 | 27 | 60.5 |
| 2 | Cottonseed | {1% Pd on C, 5% Ag Ac} | 0.005 | 185 | 0 | do | 330 | 69 | 34.0 | 25.0 | 3.6 | 24.6 | 37.7 |
| 3 | Cottonseed | {1% Pd on C, 1% BiOAc} | 0.0025 | 185 | 0 | High | 290 | 69 | 35.0 | 28.0 | 3.3 | 24.5 | 56.6 |
| 4 | Cottonseed | {1% Pd on C, 0.5% BiOAc, 0.8% Ag Ac} | 0.0005 | 170 | 30 | do | 300 | 68 | 35.5 | 27.1 | 3.2 | 25.4 | 48.0 |
| 5 | Soybean | 1% Pd on C | 0.0001 | 180 | 40 | High | 60 | 81 | 39.0 | 24.5 | 13.0 | 17.0 | 48.0 |
| 6 | Soybean | {1% Pd on C, 0.35% BiOAc, 0.8% Ag Ac} | 0.0001 | 180 | 40 | do | 220 | 80 | 36.0 | 26.0 | 8.0 | 14.0 | 43.0 |

*Table I*
HYDROGENATION OF CASTOR OIL

| Experiment | T., °C. | Pressure, p.s.i.g. | Agitation, r.p.m. | Catalyst | Percent Pd in Oil | Time, min. | Hydrogenated Castrol Oil ||||
|---|---|---|---|---|---|---|---|---|---|---|
| | | | | | | | I.N. | Capil. M.P. | OH No. | Acid Val. |
| 1 | a 30–60 | | | A | 0.1 | 160 | 3.7 | 83 | 126 | |
| 2 | 100 | 50 | 420 | A | 0.1 | {100, 200} | {25, 3.5} | {56, 70} | {110, 95.2} | |
| 3 | 112–115 | 30 | 800 | C | 0.01 | {b 120, 180} | {7.3, 5.5} | {85.5, 85.7} | {138.6, 138.8} | |
| 4 | 122–125 | 40 | 800 | B | 0.002 | 180 | 5.4 | 82.3 | 128.5 | |
| 5 | 122–125 | 40 | 620 | B | 0.001 | 330 | 34.6 | 71 | 123 | |
| 6 | 86–90 | 30 | 620 | B | 0.004 | 285 | 5.6 | 83.5 | 135.5 | |
| 7 | 86–90 | 40 | 620 | C | 0.005 | 440 | 12 | 83 | 136.5 | |
| 8 | 92–95 | 40 | 620 | B | 0.005 | 275 | 2.8 | 82.5 | 129.7 | |
| 9 | 96–100 | 45 | 620 | C | 0.0055 | 400 | 3.8 | 85.8 | 144.8 | 1.8 |
| 10 | 96–100 | 45 | 620 | C | 0.0065 | 375 | 4 | 86 | 145 | 1.8 | a One part of castor oil was dissolved in 60 parts of ethanol and the hydrogenation done in a shaking apparatus. The temperature was increased as the reaction rate dropped.
b Samples removed before finish of hydrogenation.

Catalysts:
  A—5% Pd on charcoal.
  B—1% Pd on charcoal.
  C—Catalyst of Example 1.

Table III
HYDROGENATION OF COTTONSEED AND SOYBEAN OILS FOR SHORTENING STOCK

| Experiment | Catalyst | Oil | T., °C. | Pressure, p.s.i.g. | Time, mins. | I.N. | Wiley M.P. °C. | Hydrogenated product ||||
|---|---|---|---|---|---|---|---|---|---|---|---|
| | | | | | | | | Congeal Point, °C. | Linoleic Acid, Percent | Saturated Acid, Percent | Trans Isomers, Percent |
| 7 | 1% Pd on C | Cottonseed | 80 | Atmos | 255 | 63 | 40.5 | 31 | 3.0 | 31.3 | 54 |
| 8 | {1% Pd on C, 0.8% Ag Ac, 0.5% BiOAc} | Cottonseed | 80 | Atmos | 340 | 63.5 | 38.5 | 26.5 | 2.3 | 28.3 | 36 |
| 9 | {1% Pd on C, 0.5% Ag Ac, 0.35% BiOAc} | Cotton seed 30%, Soybean 70% | 50 | 15 | 120 | 70.1 | 41.0 | 27.4 | 5.8 | 24.5 | 25 |

Table III gives some examples of the use of modified palladium on carbon catalysts for the hydrogenation of natural oils to shortening stock. It is to be noted that the use of a modified palladium catalyst gives much less of the unwanted trans isomers than the unmodified palladium.

For both margarine oil and shortening stock, the best method of measuring plastic properties is by dilation (Official Method of Americal Oil Chemists' Society—Cd–10–57). Some measurements of the products described in Tables II and III are given in Table IV.

Table IV
PLASTIC PROPERTIES OF HYDROGENATED OILS

| Experiment | Table | Solid Fat Index, °C. ||||
|---|---|---|---|---|---|
| | | 21.1 | 26.1 | 36 | 42 |
| 7* | III | 44.0 | 38.0 | 17.1 | 1 |
| 8 | III | 25.7 | 19.0 | 4.8 | 0 |
| 9 | III | 14.9 | 12.4 | 5.1 | 1.1 |
| 1* | II | 48.0 | 41.0 | 12.0 | 0 |
| 4 | II | 26.0 | 18.0 | 3 | Negative |
| 5 | II | 17.5 | 11.2 | 2.9 | 1 |
| 6 | II | 19.0 | 13.0 | 1.8 | 0 |

*Unmodified palladium catalysts.

It can be seen from Table IV that the plastic properties of those products obtained with unmodified palladium are not nearly as satisfactory as those products obtained with a modified palladium catalyst.

As set forth heerin, the modified palladium catalysts of this invention provide hydrogenated unsaturated vegetable oils having less trans isomers in the product, and lower melting point, than similar products made with ordinary palladium catalyst. The hydrogenation selectivity displayed by these catalysts, particularly palladium catalysts modified by a bismuth compound and silver either as a compound or as reduced metal can be employed with advantage in the hydrogenation of cottonseed oil to give a partially hydrogenated product useful as a hard butter to replace cocoa butter or to be used in blends with it.

The physical characteristics of cocoa butter which make it unique among the naturally occurring fats, and which are responsible for its universal use in confectionery products are well known. In particular, cocoa butter is unusual in that it is normally a solid up to about 25° C., has a relatively narrow melting range, and is almost completely liquid at 35° C. The extremely short softening and melting range of cocoa butter, coupled with a melting point a few degrees below body temperature, are probably the result of a very high content of 2-oleodisaturated ($S_2U$) glycerides of palmitic and stearic acid, characteristic major components of commercial cocoa butter.

For many years, efforts have been made to duplicate the unique characteristics of cocoa butter by treating, in various ways, cheaper and more readily available naturally occurring fats such as cottonseed oil. A typical analysis cottonseed oil fatty acids was given as myristic ($C_{14}$ saturated) 1.4% palmitic ($C_{16}$ saturated) 23.4%, ($C_{16}$ unsaturated) 2.0%, stearic ($C_{16}$ saturated) 1.1%, oleic ($C_{18}$ cismonoolefinic) 22.9%, linoleic ($C_{19}$ diolefinic) 47.8%, and arachidic ($C_{20}$ saturated) 1.3%. Equivalent glycerin and not over 1.5% unsaponifiable matter was also present. (T. P. Hilditch and L. Maddison, J. Soc. Chem. Ind. 59, 162–8, 1940). Cottonseed oil resembles cocoa butter in that both contain about 25% of palmitic acid.

Desirably, such substitute products will not only have the melting characteristics of cocoa butter, but should be capable of admixture with cocoa butter, the latter in amounts of from 10–50%, to give a homogenous mixture which retains the physical characteristics of cocoa butter throughout the range of temperatures from room temperature to body temperature.

While the physical properties of such a useful hard butter cannot be defined with scientific accuracy, its most important feature is a narrow softening and melting range similar to cocoa butter. The usefulness of such preparations to take the place of cocoa butter is therefore evaluated primarily in terms of such ranges as suitably defined by American Oil Chemists' Society Official Methods. Four such official methods are the following:

Cc 1–25—Melting point, capillary tube method:
Temperature at which solid fat in a closed-ended 1 mm. I.D. capillary becomes a clear melt under prescribed conditions.

Cc 2–38—Wiley melting point, modified A.O.A.C.:
Temperature at which disc-shaped fat suspended in an alcohol-water mixture of the same density assumes a spherical shape.

Cc 3–25—Softening point, open tube melting point:
Temperature at which fat column rises in an open-ended 1 mm. I.D. capillary under prescribed conditions.

Cc 14–59—Congeal point:
A dried liquid fat is cooled under prescribed conditions. Crystallization causes an increase of temperature and the peak of this is measured.

The hard butters of this invention are characterized by Wiley melting point—congeal point differences of not more than about 6° C., preferably not more than about 5° C. One favorable product had a capillary melting point of 37.8°, a Wiley melting point of 37.4°, a softening point of 37.1°, and a congeal point of 34.8°. The Wiley melting point—congeal point difference in this case was 2.6° C. Cocoa butter itself has a Wiley melting point of about 33.5° C. and a congeal point of about 29° C., a difference of 4.5° C. The prior art hard butters to my knowledge are much inferior, having melting point—congeal point differences of 8° C. or more. In accordance with this invention the Wiley melting point should be higher than cocoa butter's temperature of 33.5° C. and not higher than about 40° C. Within this temperature range the preferred Wiley melting point will depend in part on the climate of the use for the hard butter, higher Wiley melting points being required for warmer climates.

Another important criterion of a useful hard butter is Solid Fat Index or Dilatation. A.O.C.S. Tentative Method Cd 10-57 provides an empirical measure of solid fat content at given temperatures. According to this procedure water and melted fat are placed in a dilatometer and dilation with temperature increase of the fat after chilling is measured following prescribed procedures. Melting dilation of the fat is expressed in ml. per kg. of fat, or in terms of the Solid Fat Index approximately as percent dilation.

When solid mixtures of different chemical composition are mixed together the melting range of the product is generally below the weighted average of the melting ranges of the materials mixed. If cocoa butter were blended with a fat with a similar average melting range, the product would be unsatisfactory because softer than the natural cocoa butter. It is therefore necessary for the hard butter which is to be used for blending with cocoa butter to be firm at a higher temperature than cocoa butter itself. Suitable hardness for such a hard butter is defined in terms of the Solid Fat Index as at least about 55% solid at 20° C. (compared to 65% solid in untempered natural cocoa butter), between 5% and 20%, preferably between 10% and 17%, solid at 36° C. (compared to 0% solid in natural cocoa butter), and 0% solid at 42° C. Samples 12, 13 and 14 of this invention described in the following Table V meet these specifications.

Other distinguishing features of the favorable hard butter products of the invention are now given. Polyunsaturate content, e.g. linoleic acid, equal to cocoa butter's linoleic content of 2.2% or less is important. The best products have substantially no polyunsaturated acids present, with consequent improved stability.

Iodine No. is suitably from 59 to 65, if the hard butter is to be used without crystallizing out a trisaturated fat glyceride ($GS_3$) portion. If a $GS_3$ portion is to be removed, the product before crystallization should have a lower iodine number in the range of 40 to 60 providing an uncrystallized product with iodine number in the range of 50 to 65.

Trans isomer content of the hard butter of this invention is higher than has been accomplished by the prior art with favorable other properties, preferably over 50%. Products from cottonseed oil with trans isomer contents between 50% and 60% have been successfully prepared, and such products have the outstanding narrow temperature range between melting point and congeal point which has been described. Particularly favorable hard butters in accordance with this invention contain between 52% and 58% of trans isomer content. By trans isomer content values it is meant that this percentage of the fatty acids present is in the form of trans isomers. Based on monoolefins present as much as 80% or more is in the trans form.

The importance of high trans monoolefin content in hard butters used for blending with cocoa butter is understood in terms of greater similarity in softening properties to the cocoa butter than other readily available fat compounds. Cocoa butter melts at 33.5° C. as compared to the favorably somewhat higher melting points of 43.7° for elaidic acid and 42° for glyceryl trielaidate. By contrast palmitin melts at 65.5°, stearin at 72.5° and olein at 5° C. Although compatibility characteristics of mixtures of fats with cocoa butter cannot be definitely predicted and testing is always needed, there is a general relationship that fats from acids with melting points closer to cocoa butter are more compatible. Glyceryl trielaidate is too soft to be favorable for blending with cocoa butter, but a high elaidic acid content of the fat and treatment with the catalyst of this invention with its favorable glyceride rearrangement activity makes possible such combinations as $GE_2P$, $GE_2S$, $GEP_2$, $GEPS$, and $GOES$, where G stands for "glyceryl," E stands for "elaidate," P stands for "palmitate," S stands for "stearate" and O stands for "oleate."

Although the favorable trans monoolefin content range for hard butters prepared from cottonseed oil is quite narrow as has been discussed, a somewhat more flexible composition as regards oleic acid, stearic acid and palmitic acid is possible. If the saturated acid is mainly palmitic, little oleic acid can be tolerated. However, if more stearic acid is present a somewhat greater amount of oleic acid is possible for a hard butter of satisfactory softening and melting range and compatibility with cocoa butter.

Specific examples of the possible composition ranges of fatty acids present in the hard butters of this invention are the following. A sample of cottonseed oil hydrogenated to a satisfactory product with an Iodine Number of 60 (Experiment 14 of the following Table V) was found to contain 54% trans monoolefin, 12% oleic acid, 1.8% linoleic acid, 25% palmitic acid and 7% stearic acid. Various products were hydrogenated from cotton seed oil followed by removal of a crystallized portion as detailed in the following Table VI. Trans monoolefin contents of these products prepared in accordance with this invention ranged from 50.0% to 55.8%, cis monoolefin content from 10.3% to 21.5% (with the latter somewhat too soft), and saturated acids content from 28.0% to 35.7%. The saturated acids were not further analyzed. Linoleic acid content was 1.3% in one sample, 0.5% in another and 0% in three others.

In view of evaluation of properties of the products prepared, including their compatibility with cocoa butter, the following composition ranges based on total fatty acids for products prepared from cottonseed oil are preferred:

| | Percent |
|---|---|
| Elaidic acid | 52 to 58 |
| Oleic acid | 7 to 20 |
| Saturated acid | 29 to 41 |
| Lineoleic acid and $C_{16}$ unsaturates | 0 |

The distribution of saturated acids in favorable products prepared from cottonseed oil is 26% to 38% palmitic acid and 3% to 15% stearic acid. It is understood that in determining saturated acids any myristic acid present is included with the palmitic acid and any arachidic acid present is included with the stearic acid.

A favorable product prepared from refined cottonseed oil in accordance with this invention (Experiment 21a of the following Table VI) was given a proximate analysis as to fatty acids, which showed about 36% saturated (palmitic and stearic) acids, 10% oleic acid, and 54% elaidic acid. The product was essentially free from $C_{16}$ unsaturates, linoleic acid, and $GS_3$ compounds, and consisted mainly of $GSU_2$ and $GS_2U$ compounds.

The favorable properties of the hydrogenated cottonseed oil, as will be specifically indicated in additional examples, are regarded as resulting from the high selectivity of hydrogenation with the novel supported Pd—Ag—Bi catalyst of this invention. The presence of the Ag and Bi is understood to make the catalyst an effective rearrangement catalyst for glycerides, minimizing presence of $GS_3$ and $GU_3$ compounds in the hydrogenate. Hydrogenation of the cottonseed oil to an Iodine No. of about 50 essentially removed all polyunsaturated acids from the cottonseed oil while forming less than 5% of trisaturated glycerides ($GS_3$). After a single precipitation or crystallization the $GS_3$ material can be essentially removed, leaving as products mainly monosaturated, diunsaturated glycerides ($GSU_2$) and disaturated, monounsaturated glycerides ($GS_2U$).

If other fatty oils than cottonseed oil are hydrogenated with the catalyst of this invention as a step in preparing a hard butter, the product composition will be somewhat modified as a result of the differing characteristics of the oil used. For example, soybean oil contains from about 12% to 16% saturated acids including about 10% palmitic acid. Unsaturated acids constitute some 80% to 90% of the total acids; they are chiefly linoleic, which may be 50% of the total fatty acids, oleic acid and linolenic acid. Because of the lower saturated acid content than cottonseed oil, it may be desirable to hydrogenate soybean oil selectively to a higher elaidic acid content than cottonseed oil. The trans monoolefin content of the soybean oil hydrogenate may be as high as 70% or even higher.

The product may be blended with from 10–50% by weight, preferably up to 30% of cocoa butter with good compatibility, i.e. with a blend difference between melting point and congeal point similar to cocoa butter itself and with Solid Fat Index or Dilatation not greatly changed from cocoa butter. Chocolate prepared with such blends has good gloss retention and is free from the bloom appearing in chocolate made from unextended natural cocoa butter. By bloom is meant the familiar localized white appearance found in chocolate products after standing. Such blends suitably have Wiley melting points between 32° C. and 38° C., Wiley melting point—congeal point differences no greater than 8° C., preferably no greater than about 5° C. They also have dilatation at 20° C. of more than 50, preferably more than 60, at 36° from 0 to 10, and at 42° of 0.

EXAMPLE VI

In order to demonstrate the advantages of the modified palladium catalysts of this invention in preparing a cocoa butter substitute, a series of hydrogenations of refined cottonseed oil were conducted employing a conventional 1% palladium on charcoal catalyst and a modified palladium catalyst prepared as in Example II. The modified catalyst had a Pd:Ag:BiOAc ratio as prepared of 1:0.65:0.40, the 0.40% BiOAc being equivalent to 0.29% Bi. Assay determinations showed the catalyst to contain 0.67% Ag and 0.26% Bi. The hydrogenations were effected at a temperature between 160–180° C. in a stirred autoclave at 5 p.s.i.g. pressure; 1.5 kilograms of oil and 7.5 grams of catalyst were employed in each run. The hydrogenation was carried out for 1½ hours or longer, depending on the Iodine Number desired.

The results of these tests are set forth in Table V below. For comparison purposes, properties of cocoa butter and available information concerning two prior art prepared hard butters are included in this table.

In general, the proportion of the catalyst of this invention required for effective hydrogenation of cottonseed oil is typically from .4 to .6 weight percent, and may be as high as .8% when the catalysts are modified by larger amounts of silver and bismuth.

as a cocoa butter substitute. The product of Experiments 10 and 11 showed poor compatibility with 20% cocoa butter.

In Experiments 12, 13 and 14, refined cottonseed oil was successfully hydrogenated to an Iodine Number between 59 and 65 to give a product having desirably low melting point, and a solid fat index suitable for mixture with cocoa butter. It should be noted that the products of these experiments were completely liquid at 42° C. These products showed satisfactory compatibility with 20% cocoa butter. Hydrogenation to a lower Iodine Number (Experiments 15 and 16) resulted in an undesirable increase in melting point and solid fat content at 36° C. and 42° C., although the linoleic acid content was favorably reduced.

Experiments 10, 11, 12 and 16 provided Wiley melting point—congeal point temperature differences between 5° and 6° C. Superior by this important criterion were the temperature differences for Experiments 13, 14, and 15, which were as follows: No. 13, 4.7°; No. 14, 4.0°; and No. 15, 42°. In comparison, cocoa butter has a corresponding temperature difference of 4.5° C., and the melting point—congealing point temperature differences of prior art products prepared from cottonseed oil in accordance with U.S. Patents 2,972,541 and 2,898,211, as indicated in Table V, are greater than 8° C. The prior art products due to these large temperature differences are regarded as unsuitable for blending with cocoa butter.

As will be evident from the data presented in Table V above, the modified palladium catalysts of the invention provide hydrogenated cottonseed oil having physical characteristics which make the product suitable as a hard butter. It has been found that an even better hard butter (at the cost of some reduction of product) can be prepared by carrying out the hydrogenation with the silver-bismuth modified palladium catalyst to an Iodine Number between about 40 and 60, and solvent fractionating the hydrogenated fat to separate the less soluble solid fat fraction. Such separation can, for example, be effected by dissolving the hydrogenated fat in a suitable fat solvent, e.g. acetone, MEK, hexane, or the like, cooling to a temperature between about 15° and about 30° C., preferably between 20° and 27° C., and separating the crystallized or precipitated fraction therefrom by filtration, decantation, or other conventional means. In general, solvent fractionation at a temperature within the indicated range (and with suitable

*Table V*

| Experiment | Catalyst | Iodine number | Wiley M.P. °C. | Congeal Pt. °C. | Solid fat index | | | Linoleic acid | Trans monoolefin percent |
|---|---|---|---|---|---|---|---|---|---|
| | | | | | 20° | 36° | 42° | | |
| 10—(No. 2) | 1% Pd/C | 62.4 | 43.5 | 38.2 | 58 | 29.5 | 12 | 4.5 | 57 |
| 11—(No. 7) | 1% Pd/C | 55.2 | 46 | 40.2 | 58 | 37 | 18 | 1.7 | 55 |
| 12—(No. 1) | Modified Pd | 64.2 | 37.3 | 32.2 | 54.5 | 9.7 | 0 | 3.3 | 54 |
| 13—(No. 3) | Modified Pd | 62.7 | 39 | 34.3 | 56 | 14.4 | 0 | 2 | 55 |
| 14—(No. 4) | Modified Pd | 60.0 | 39.6 | 35.6 | 56.5 | 16.2 | 0 | 1.8 | 54 |
| 15—(No. 5) | Modified Pd | 58.1 | 41.5 | 37.3 | 58 | 23.6 | 2.2 | 0.3 | 53 |
| 16—(No. 6) | Modified Pd | 55.5 | 43 | 37.5 | 59 | 28.3 | 9.5 | 0.2 | 48 |
| Cocoa Butter [1] | | 37 | 33.5 | 29 | 65 | 0 | 0 | 2.2 | ([4]) |
| Product of U.S. Patent 2,972,541 | Ni | 54.4 | [2] 46.7 | 38.1 | | | | | 38.9 |
| Product of U.S. Patent 2,898,211 | Ni | 54.0 | 35.5 | [3] 27.5 | | | | | |

[1] Not tempered.
[2] Capillary or thermal M.P.; data from Table I Ex. 9 of patent.
[3] Softening point; it is noted that as the softening point is higher than the congeal point the Wiley melting point—congeal point difference here is greater than 8°C. The data are taken from Example 8, Fraction B of the patent. This product is a 30% yield middle crystallization product as compared to other hard butters in this table, which are 100% yield products.
[4] Traces.

It will be noted that hydrogenation of cottonseed oil with conventional palladium catalyst (Experiment 10) gave a product having an excessively high melting point and a high fat index at 36° and 42° in spite of the fact that hydrogenation was not carried out to the point where linoleic acid content was adequately lowered. As shown by Experiment 11, further hydrogenation with this catalyst to more completely eliminate polyunsaturates further raised the melting point and made the product unsuitable selection of fat-solvent ratios) is effected to separate from about 10 to about 40% of the hydrogenated product. The fat which remains in solution, and which is recovered by evaporation of the solvent, is found to have a lower melting point and improved solid fat index. Such products show good compatibility with cocoa butter, and excellent oxidative stability.

EXAMPLE VII

Refined cottonseed oil was hydrogenated using the catalyst and procedure set forth in Example VI above. In each case, the hydrogenated fat was dissolved in about 10-15 times its weight of acetone, the solution cooled to about 25° C., and the solids which precipitated were separated by filtration. The mother liquor was freed of solvent by evaporation in a steam bath, and the physical properties of the recovered acetone-soluble fraction determined. The physical properties of total hydrogenate and of the recovered soluble fat are set forth in Table VI below.

favorable properties of blends of this invention with natural cocoa butter is the following Example VIII.

EXAMPLE VIII

Chocolate compositions were prepared as follows:

Experiment 23

|  | G. |
|---|---|
| Hard butter of Experiment 21a | 15 |
| Cocoa powder containing 20% cocoa butter | 12.5 |
| Powdered sucrose | 22.5 |

Table VI

| Experiment | Catalyst | Iodine number | Wiley M.P. °C | Congeal Pt. °C | Solid fat index | | | Fat recovered (percent by total) | Linoleic acid percent | Cis mono-olefins percent | Trans mono-olefins percent | Saturated acids percent |
|---|---|---|---|---|---|---|---|---|---|---|---|---|
| | | | | | 20° | 36° | 42° | | | | | |
| 17 | (Run 7) 1% Pd/C | 55.2 | 46 | 40.2 | 58 | 37 | 18 | | 1.7 | | 55 | |
| 17a | Acetone extract of 17 | 60.1 | 38.5 | 28.6 | 53 | 14 | 0.4 | 77 | 4.4 | 3.9 | 57.0 | 34.7 |
| 17b | 17a+20% cocoa butter | 55.4 | 35.7 | 28.5 | 49 | 6.1 | 0 | | | | 46 | |
| 18 | (Run 5) Modified Pd | 58.1 | 41.5 | 37.3 | 58 | 23.6 | 2.2 | | 0.3 | | 53 | |
| 18a | Acetone extract of 18 | 61.4 | 38 | 33.4 | 57.4 | 16.7 | 0 | 90 | 1.3 | 13.0 | 55.8 | 29.9 |
| 18b | 18a+20% cocoa butter | 56.5 | 37 | 29.5 | 56.5 | 8.7 | 0 | | | | 45 | |
| 19 | (Run 6) Modified Pd | 55.5 | 43 | 37.5 | 59 | 28.3 | 9.5 | | 0.2 | | 48 | |
| 19a | Acetone extract of 19 | 62 | 34 | 28 | 51 | 1.8 | 0 | 80 | 0.5 | 21.5 | 50.0 | 28.0 |
| 19b | 19a+20% cocoa butter | 57 | 23.1 | 27 | 50 | 0.3 | 0 | | | | 40 | |
| 20 | (Run 8) Modified Pd | 50.7 | 45.6 | 41.8 | 69.4 | 48.3 | 22.5 | | 0 | | 50.2 | |
| 20a | Acetone extract of 20 | 57.7 | 37.5 | 33.7 | 61.4 | 14.4 | 0 | 69 | 0 | 12.1 | 53.0 | 34.9 |
| 20b | 20a+20% cocoa butter | 55.4 | 35.7 | 28.5 | 49 | 6.1 | 0 | | | | 46 | |
| 21 | (Run 9) Modified Pd | 47.8 | 46.5 | 41.5 | 72.3 | 53 | 35 | | 0 | | 48 | |
| 21a | Acetone extract of 21 | 55.3 | 37.4 | 34.8 | 62.7 | 15.7 | 0 | 71 | 0 | 10.3 | 54.0 | 35.7 |
| 21b | 21a+20% cocoa butter | 52 | 36.4 | 31.5 | 61.2 | 8.3 | 0 | | | | 42.8 | |
| 22 | (Run 10) Modified Pd | 39.2 | 51 | 46.4 | 72.7 | 63.9 | 53 | | 0 | | 44 | |
| 22a | Acetone extract of 22 | 50.4 | 40 | 33.2 | 63.7 | 26.7 | 0.5 | 56 | 0 | 12.2 | 45.0 | 42.8 |
| 22b | 22a+20% cocoa butter | 47.7 | 38.5 | 31 | 61.5 | 16.6 | 0 | | | | 35 | |

Referring to Table VI, it will be seen that utilization of a conventional palladium catalyst (Run 17) gave a hydrogenated product which yielded an acetone extract having good melting point, but low solid fat content at 20° C., although the solid fat at 36° did not exceed the desired 20% maximum. It should also be noted that there was a substantial difference between the melting point and congealing point.

On the other hand, the modified catalysts disclosed herein give a hydrogenated product from which a fat could be distribution separated in high yield having physical properties meeting the requirements for cocoa butter substitute. Thus, from the products obtained by hydrogenation to an iodine value between about 45 and about 60 an acetone extract may be obtained having fat index above 60 at 20° C., between 10 and 17 at 36° and 0 at 42°, and Wiley melting point between 33.5° and 40° C. Wiley melting point—congeal point differences for Experiments 18a, 20a and 21a were, respectively, 4.6°, 3.8° and 2.6°; trans isomers, respectively, 56%, 53% and 54%, and yields, respectively, 90%, 69% and 71%. It is understood that the rather low solids content of Experiment 18a was due to excessive removal of higher melting solid by crystallization. It will be noted that hydrogenation can be carried too far, e.g. Experiment 22, where the yield is poor since the saturated fat separated by acetone extraction is high, and the fat still has excessive solids content at 36° C. The product, however, could be improved by further separation of solid fat, e.g. by repeating the recrystallation at a somewhat lower temperature.

The acetone-extracted products of Experiments 18-22 were all rated good to excellent in compatibility with cocoa butter, whereas the product of Experiment 17a was less satisfactory.

The Wiley-melting point—congeal point difference for the Experiment 21b blend with 20% of natural cocoa butter was superior, 4.9° C. This blend had an Iodine No. of 52, a Wiley melting point af 36.4° C. (favorably a little higher than cocoa butter), trans isomers 42.8%, Solid Fat Index of 61.2 at 20° C., 8.3 at 36° C. and 0 at 42° C., these properties being based on the Experiment 21a material provided with uncrystallized yield from cottonseed oil of 71%. As further evidence of the Experiment 24

| | |
|---|---|
| Cocoa butter | 15 |
| Cocoa powder with 20% cocoa butter | 12.5 |
| Powder sucrose | 22.5 |

Experiment 24 was observed to have marked bloom in about a month, whereas the product of Experiment 23 showed no bloom after one year's standing.

It will be obvious to those skilled in the art that many modifications may be made within the scope of the present invention without departing from the spirit thereof, and the invention includes all such modifications.

What is claimed is:

1. A method for hydrogenating unsaturated fatty oils which comprises treating the oil with hydrogen under hydrogenation conditions including a temperature in the range of about 40 to 200° C. and pressure in the range of atmospheric to about 1000 p.s.i. in the presence of a catalyst comprising a solid support having deposited thereon palladium metal and a modifying material selected from the group consisting of (a) bismuth subacetate, bismuth acetate $BiCl_3$ and BiOCl, and (b) mixture of a compound of group (a) and silver, and (c) mixtures of a compound of group (a) and a silver compound of the group consisting of silver acetate, $Ag_2SO_4$ and $AgNO_3$, the palladium metal being present in the range of .001 to 10 percent by weight, and the modifying material being present in the range of .005 to 10 percent by weight, based upon the weight of said oil, being in the range of about 0.00005 to 0.1 percent.

2. The process of claim 1 wherein the modifying material consists of a mixture of bismuth subacetate and silver acetate.

3. A method according to claim 1 in which the oil is castor oil.

4. A method according to claim 1 in which the oil is cottonseed oil.

5. A method according to claim 1 in which the oil is soybean oil.

6. A method according to claim 2 in which the oil is castor oil.

7. A method according to claim 2 in which the oil is cottonseed oil.

8. A method according to claim 2 in which the oil is soybean oil.

9. The process of claim 1 wherein cottonseed oil is hydrogenated for a period of time sufficient to reduce the Iodine Number to a value between about 60 and about 65, and recovering a hydrogenated oil containing less than about 3% of linoleic acid and having a Wiley melting point below 40° C. and a Solid Fat Index of at least about 55 at 20° C., between about 5 and 20 at 36° C. and about 0 at 42° C.

10. The process of claim 1 wherein cottonseed oil is hydrogenated for a period of time sufficient to reduce the Iodine Number to a value between about 45 and about 60, dissolving the hydrogenated product in a fat solvent, cooling the solution so formed to a temperature between about 15° and 30° C. to form a precipitate, separating said precipitate so formed from the liquid remaining, and recovering a hydrogenated fat from said liquid having a Wiley melting point below 40° C. and a Solid Fat Index of at least about 60 at 20° C., between about 5 and 20 at 36° C. and about 0 at 42° C.

11. The process of claim 10 wherein said fat solvent is acetone.

References Cited by the Examiner
UNITED STATES PATENTS

| | | | |
|---|---|---|---|
| 1,275,405 | 8/18 | Dewar et al. | 260—409 |
| 2,898,211 | 8/59 | Barsky et al. | 99—118 |
| 2,948,742 | 8/60 | Zajcew | 260—409 |
| 2,972,541 | 2/61 | Cochrane et al. | 99—118 |

A. LOUIS MONACELL, *Primary Examiner.*